(12) United States Patent
Besati et al.

(10) Patent No.: US 9,885,483 B2
(45) Date of Patent: Feb. 6, 2018

(54) THERMOSTAT (71) Applicant: Luca Pedretti, Casalino NO (IT)

(72) Inventors: Davide Besati, Biandrate NO (IT);
Massimo Dugnani, Novara NO (IT);
Luca Pedretti, Dormelletto NO (IT);
Mauro Tappa, Confienza PV (IT);
Giuseppe Valzi, Casalino NO (IT)

(73) Assignee: Defendi Italy S.r.l., Camerano (IT)

( * ) Notice: Subject to any disclaimer, the term of this patent is extended or adjusted under 35 U.S.C. 154(b) by 408 days.

(21) Appl. No.: 14/431,703

(22) PCT Filed: Sep. 30, 2013

(86) PCT No.: PCT/IB2013/059000
§ 371 (c)(1),
(2) Date: Mar. 26, 2015

(87) PCT Pub. No.: WO2014/053981
PCT Pub. Date: Apr. 10, 2014

(65) Prior Publication Data
US 2015/0260410 A1  Sep. 17, 2015

(30) Foreign Application Priority Data
Oct. 1, 2012 (IT) .............................. MI2012A1633

(51) Int. Cl.
*F23K 5/00* (2006.01)
*F24C 3/12* (2006.01)
(Continued)

(52) U.S. Cl.
CPC ................ *F24C 3/12* (2013.01); *F23K 5/007* (2013.01); *F23N 5/025* (2013.01); *F23N 5/14* (2013.01);
(Continued)

(58) Field of Classification Search
CPC ..... F23K 2900/05002; F23K 2401/201; F23K 2900/05001; F23K 5/002; F23K 5/00;
(Continued)

(56) References Cited

U.S. PATENT DOCUMENTS 2,718,918 A   9/1955  Marvin
3,434,694 A   3/1969  Skinner
(Continued)

FOREIGN PATENT DOCUMENTS

AT          508263       12/2010
DE       3102123 A1       8/1982
(Continued)

*Primary Examiner* — David Teitelbaum
*Assistant Examiner* — Schyler S Sanks
(74) *Attorney, Agent, or Firm* — Themis Law (57) ABSTRACT

A thermostat for cooking appliances powered by gas includes a body defining an inlet conduit and an outlet conduit that receive a gas flow from a supply source and to supply it to a gas burner, and a chamber having a substantially cylindrical shape that is in fluid communication with the inlet conduit, and also with the outlet conduit either directly, through a main opening formed at one end thereof, or indirectly, through a secondary conduit formed in the body of the thermostat. The gas flows into the outlet conduit bypassing the main opening. A one-piece valve adjusting the gas flow rate is coaxially fitted in the chamber and guided by its peripheral walls. These features make the structural configuration of the thermostat body and its conduits is much more compact, functional and less expensive than in thermostats known in the art.

12 Claims, 4 Drawing Sheets

(51) Int. Cl.
 *F23N 5/02* (2006.01)
 *F23N 5/14* (2006.01)
 *G05D 23/02* (2006.01)

(52) U.S. Cl.
 CPC ............ *F23N 5/146* (2013.01); *G05D 23/02* (2013.01); *F23K 2401/201* (2013.01); *F23K 2900/05002* (2013.01); *F23N 2035/18* (2013.01); *F23N 2035/24* (2013.01)

(58) Field of Classification Search
 CPC .. F23K 5/007; F23N 2035/18; F23N 2035/12; F23N 2035/24; F23N 5/02; F24C 3/12
 See application file for complete search history.

(56) References Cited

U.S. PATENT DOCUMENTS

| | | | | |
|---|---|---|---|---|
| 3,704,854 | A | * 12/1972 | Katchka | ............... F23N 1/007 251/333 |
| 4,108,370 | A | * 8/1978 | Demi | ................... F23N 1/007 236/15 A |
| 4,134,573 | A | 1/1979 | Messinger | |
| 5,439,199 | A | 8/1995 | Briggs et al. | |

FOREIGN PATENT DOCUMENTS

| | | | | |
|---|---|---|---|---|
| FR | 1462547 | A | 12/1966 | |
| FR | 2366616 | A1 * | 4/1978 | ............ F23N 5/027 |
| JP | S63273723 | | 11/1988 | |
| WO | WO9958776 | A1 | 11/1999 | |

\* cited by examiner

THERMOSTAT

The present invention generally relates to the field of gas cooking appliances and in particular to a thermostat for gas cooking appliances.

Thermostats are used to maintain a desired temperature in closed compartments such as the compartment of an oven inside which a gas-fueled burner provides the thermal energy needed for cooking. Maintenance of a desired temperature is possible thanks to the use of a thermostatic bulb fitted into the heated compartment, which allows retroactive adjustment of the gas flow supplied to the burner through an expandable member operatively connected to a valve arranged within a body of the thermostat.

In the body of thermostats known in the art there is generally formed a plurality of conduits that define a first circuit for supplying gas to a nozzle generating a pilot flame and a second circuit for feeding gas to a burner. The first circuit is characterized by a predefined minimum gas flow, generally controlled by a needle valve and an adjuster screw, while the second circuit is characterized by a variable gas flow controlled by a valve which is retroactively driven by the thermostatic bulb.

When only the pilot flame is lit, the gas flows exclusively in the first circuit and the valve of the second circuit is completely closed. In a normal operation condition of the thermostat instead gas flows through both the first and the second circuits.

The desired temperature is set with the aid of a graduated scale by way of a rotatable knob, which acts on a stop member defining a maximum opening position for the valve. An expandable member of the thermostatic bulb is arranged between the valve and the stop member connected to the knob. In an operating condition of the system wherein the temperature inside the compartment increases, the expandable member of the bulb is expanded and acts on the valve by reducing the flow rate of gas supplied to the burner; on the contrary, when the temperature inside the compartment decreases, the expandable member is contracted and acts on the valve by increasing the flow rate of gas supplied to the burner. It is thus possible to achieve an operating condition of the system wherein the temperature in the heated compartment varies within a predetermined tolerance interval.

Thermostats are also known wherein a gas flow is fed directly and solely to the burner, thus eliminating the gas circuit supplying the pilot flame. To this aim, a single chamber supplied by an inlet conduit and arranged in fluid communication with an outlet conduit both through a main opening and a secondary conduit is formed in the thermostat body, the main opening and the secondary conduit being respectively designed for a maximum and a minimum flow of gas. Inside the chamber a valve for adjusting the rate of the gas flow is arranged, whose position in the chamber determines the flow of gas toward the outlet conduit through the main opening or the secondary conduit.

Known thermostats of this type comprise a frustum-conical chamber within which a frustum-conical valve of a corresponding size is fitted. The valve is rotatable in the chamber about its axis and comprises a hollow cylindrical element coaxially inserted in its frustum-shaped body and movable relative thereto in the axial direction. A radial aperture allowing a flow of gas is formed in the conical body of the valve, the aperture communicating with a corresponding radial aperture formed in the cylindrical hollow element. The gas that enters the chamber through the inlet conduit passes through the frustum-shaped body of the valve and flows toward the outlet conduit through the cylindrical element. A circumferential groove is also formed at the radial aperture formed in the frustum-shaped body of the valve, which groove allows passage of a flow of gas only upon rotation according to a predetermined angle and within a predefined angular range.

The main opening is normally closed by a plate member operatively connected on one side to the valve and on the other side to an expandable member of a thermostatic bulb. The plate member closes the main opening either when the thermostat is not operating or during an operating condition at a minimum gas flow, wherein gas flows into the outlet conduit through the secondary conduit bypassing the closure made by the plate member.

In a normal operating condition, the plate member is urged away from the main opening by the cylindrical element coaxially inserted in the valve and the gas flow is adjusted depending on the desired temperature by the expandable member of the thermostatic bulb.

The structure of this type of thermostats is characterized by a number of conduits that is extremely reduced compared to thermostats comprising a circuit for supplying a pilot flame, and is therefore much more efficient when considering the dynamic conditions of the gas flow.

However, the frustum-conical valve inserted in the chamber of the thermostat has some drawbacks. On the one hand, the coupling between the frustum-conical surfaces of the valve and the chamber must ensure seal to the passage of gas, which also applies to the coupling between the valve and the cylindrical element inserted therein, thus resulting in extremely reduced manufacturing tolerances and rather high manufacturing costs.

Furthermore, the relative movement between the parts may cause wear phenomena that may result in gas leakage through the valve over time, thus requiring its replacement.

Further types of thermostats based on the supply of gas directly and solely to the burner are also known, wherein valves having a substantially cylindrical shape are employed. Such valves are movable in the direction of their axes relative to the chamber for the passage of gas between a first position, wherein a main opening is completely clear allowing passage of a gas flow to an outlet conduit, and a second position wherein the main opening is completely closed by the valve and the gas flow reaches the outlet conduit only through a secondary conduit.

The patent publication FR 2366616 A1 describes for example a thermostat of this type, which forms the preamble of claim 1.

These thermostats are preferred to those employing frustum-conical valves, because they have fewer problems in terms of manufacturing tolerances and wear phenomena. However, these thermostats are perfectible relative to the overall size of the body wherein the conduits and the chamber for the passage of gas are formed, which is an object of the present invention. Said object is achieved with a thermostat whose main features are specified in the first claim, while other features are specified in the remaining claims.

An idea of solution underlying the present invention is to employ a one-piece valve for adjusting the rate of the gas flow, said valve having a substantially cylindrical shape and being provided with a pair of flanges formed at its ends. The valve is fitted in a chamber for the passage of gas having a substantially cylindrical shape and is movable coaxially thereto from a first position corresponding to a maximum opening, wherein a main opening of the chamber is completely clear allowing the passage of a gas flow to an outlet conduit, to a second closed position, wherein the main opening is completely closed by one of the flanges of the valve and the gas flow reaches the outlet conduit through a secondary conduit. The diameters of the flanges are substantially equal to that of the cylindrical chamber, which thus acts as a guide for the valve.

The coaxial arrangement between the chamber and the valve, as well as the coupling between its flanges and the walls of the chamber allows to achieve a very compact and functional structure of the body of the thermostat and its conduits, unlike thermostats known in the art, which are characterized by valve housings formed in suitable appendage portions of the body, such as e.g. described in the above-mentioned patent publication FR 2366616 A1.

Another advantage provided by the invention is that the main opening which connects the chamber to the outlet conduit is closed directly by a flange of the one-piece valve and not by a plate member connected thereto, thus allowing to reduce the total number of components of the thermostat, which results in manufacturing, assembly and maintenance costs that are lower than those of the known thermostats employing frustum-conical valves.

Further advantages and features of the thermostat according to the present invention will become clear to those skilled in the art from the following detailed and non-limiting description of an embodiment thereof with reference to the attached drawings in which:

Figure 1:
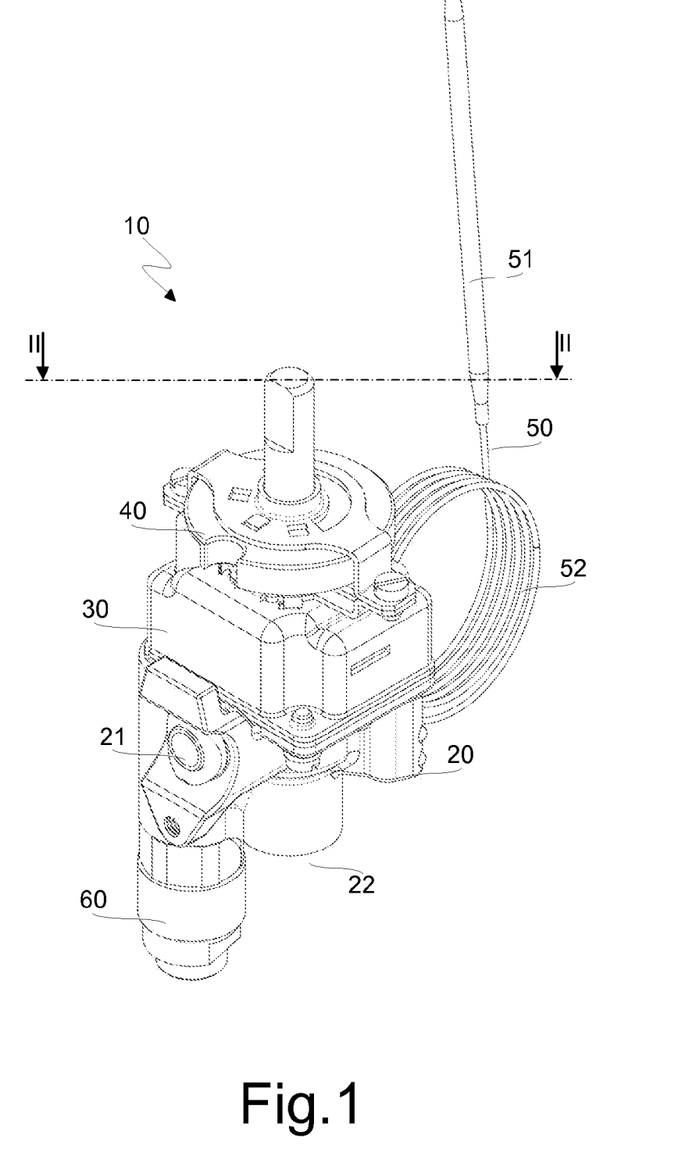
FIG. 1 is a perspective view showing a thermostat according to the invention.

Referring to FIG. 1, the thermostat 10 according to the invention comprises a body 20 inside which a plurality of conduits suitable to supply a gas flow to a burner (not shown) from an inlet opening 21 to an outlet opening 22 are formed. The inlet opening is intended to be connected to a gas supply, while the outlet opening is intended to be connected to the burner through suitable conduits.

The thermostat 10 also comprises a bell-shaped cover 30 fixed to the body 20, for example by way of screws, which rotatably supports a coupling member 40 configured to allow mounting of a knob (not shown) for ignition of the burner and temperature adjustment.

The thermostat 10 further comprises a thermostatic bulb 50 equipped with a probe 51 meant to be inserted in a compartment to be heated, e.g. the compartment of an oven. A conduit 52 filled with a thermally expandable fluid medium, e.g. a diathermic oil, is connected to the probe 51 of the thermostatic bulb 50. The thermostatic bulb 50 also comprises in known manner an expandable member 53 (shown in FIGS. 2 to 4), which is connected to the conduit 52 at the end thereof opposite to the end at which the probe 51 is fixed. The expandable member is housed within the bell-shaped cover 30. The expandable member 53 is preferably of a membrane type, whose flat shape allows to limit the overall dimensions of the thermostat 10.

As it will be described in detail below with reference to FIGS. 2 to 4, the expandable member 53 of the thermostatic bulb is operatively connected to a valve of the thermostat 10, which allows to adjust of the gas flow within its body 20.

The thermostat 10 further comprises a thermoelectric safety device 60 suitable to block the gas flow through the body 20 when voluntarily switching the burner off or when the burner flame is accidentally extinguished.

Figures 2, 2A:
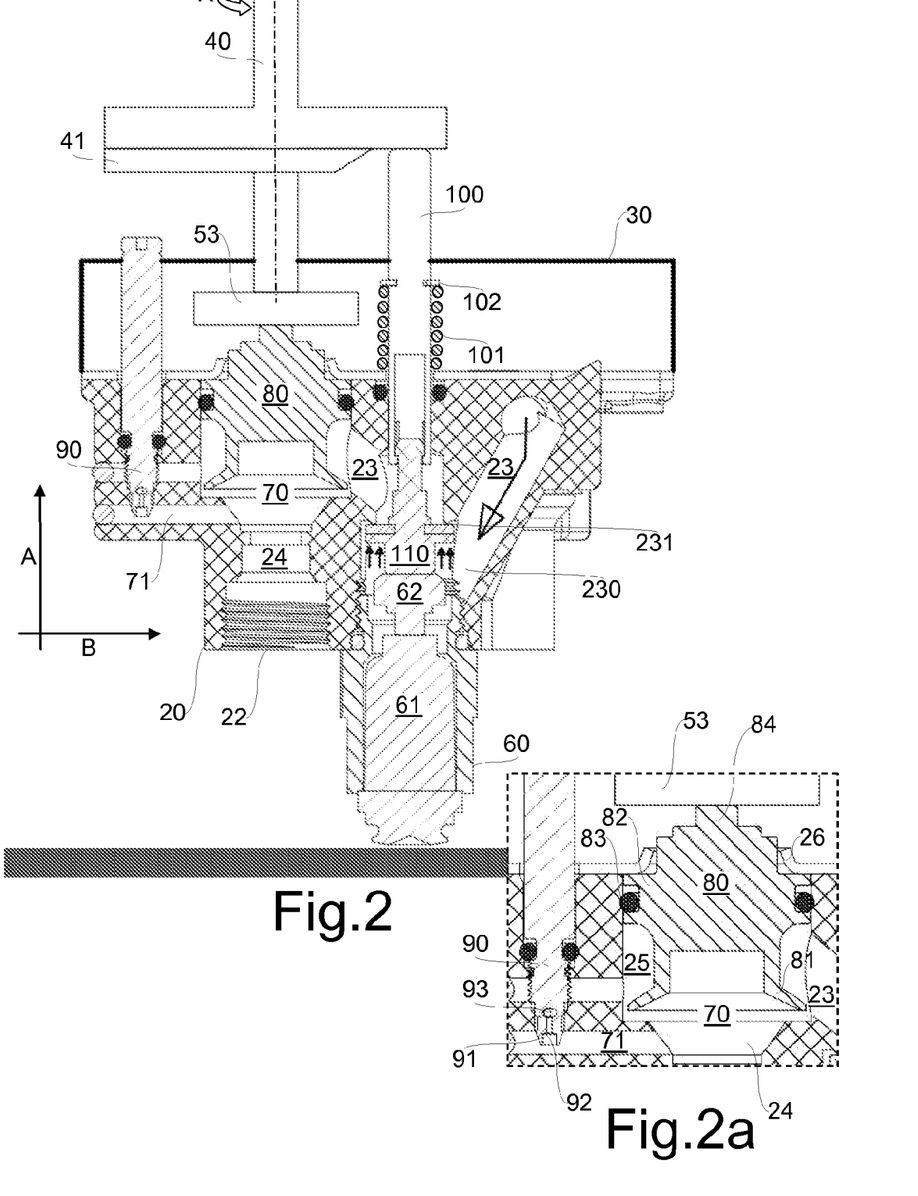
FIG. 2 is a longitudinal sectional view taken along line II-II of FIG. 1, which schematically shows the thermostat in an operating condition wherein no gas flow is allowed.
FIG. 2a shows a detail of FIG. 2.
Figures 3, 3A, 3B:
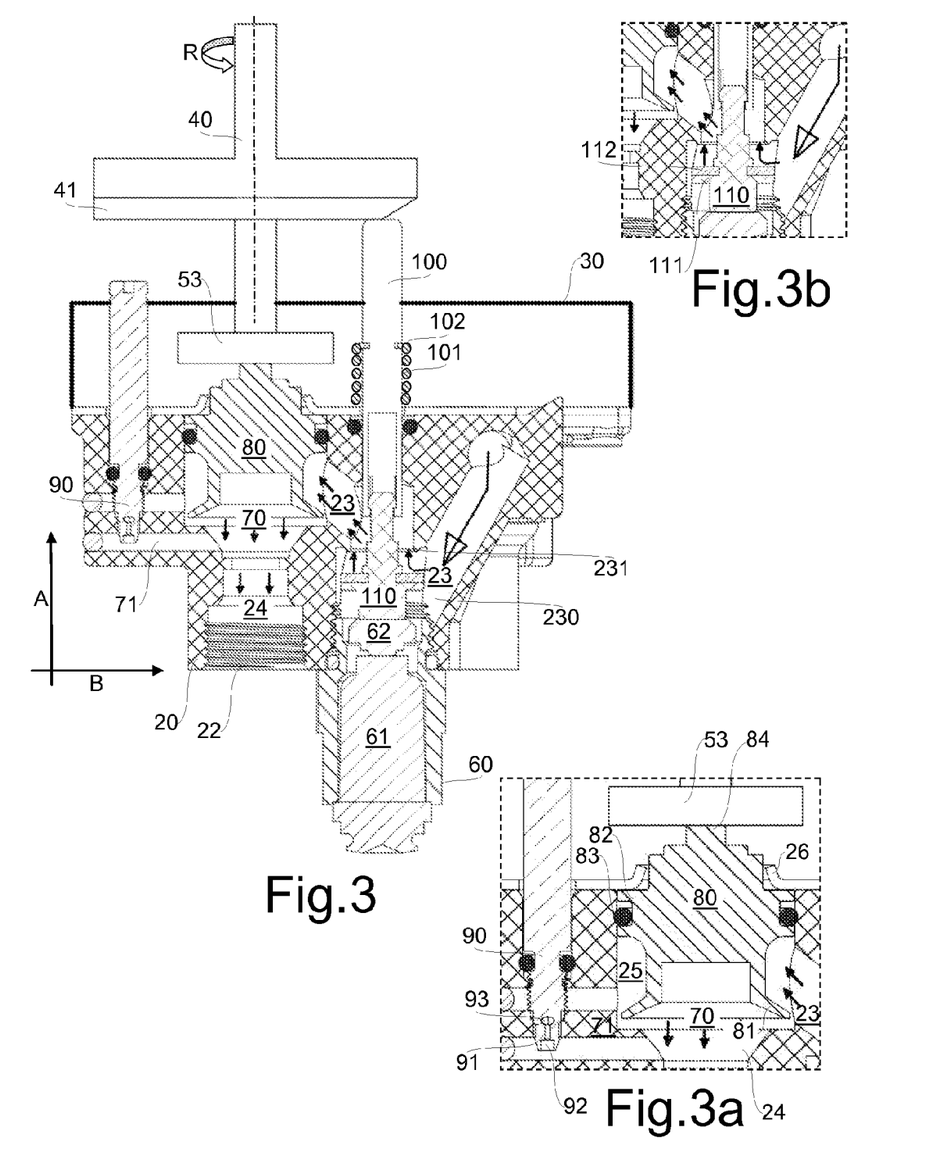
FIG. 3 is a longitudinal sectional view similar to that of FIG. 2, which schematically shows the thermostat in a normal operating condition.
FIGS. 3a and 3b show details of FIG. 3.
Figures 4, 4A:
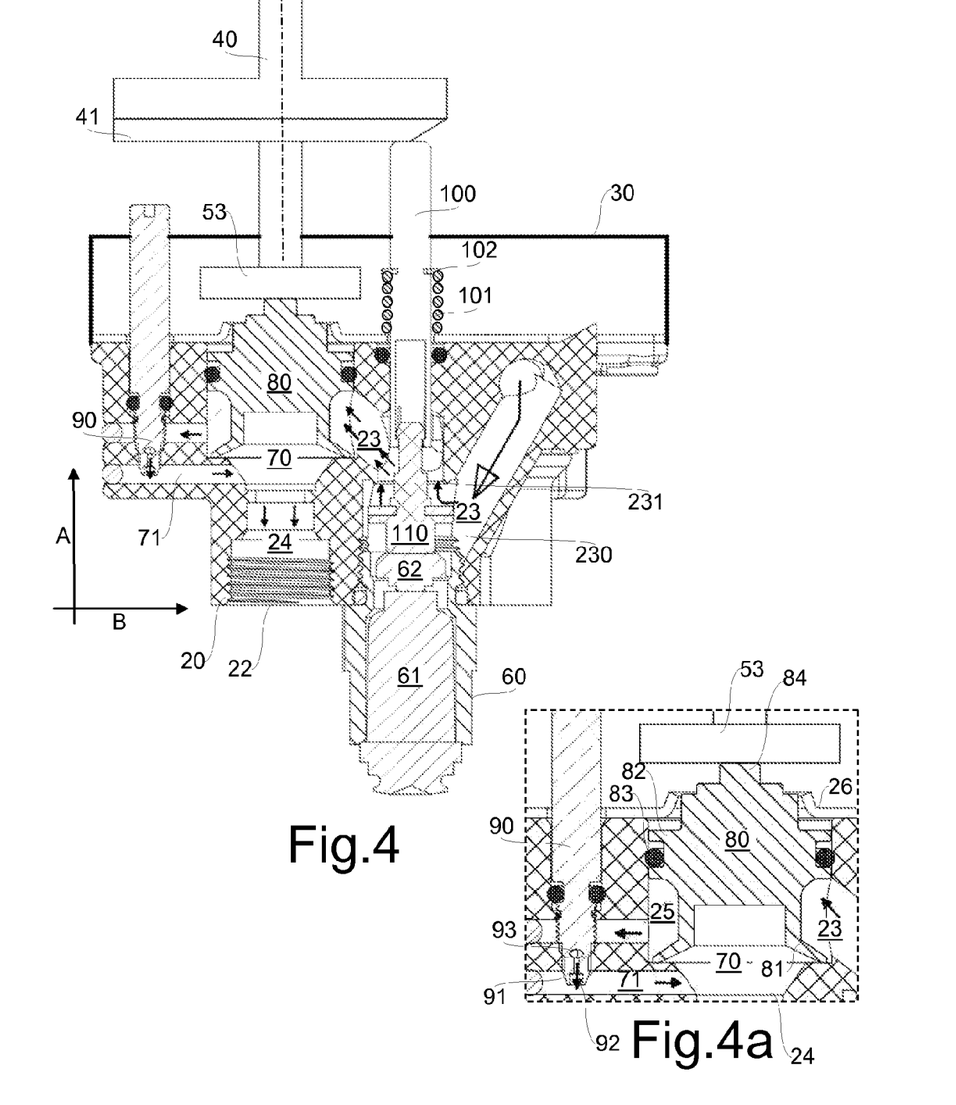
FIG. 4 is a longitudinal sectional view similar to that of FIGS. 2 and 3, which schematically shows the thermostat in an operation condition wherein a minimum flow of gas flows.
FIG. 4a shows a detail of FIG. 4.

Now referring to FIGS. 2 to 4, an inlet conduit 23 and an outlet conduit 24 are formed in the body 20 of the thermostat 10 and respectively adapted to receive a gas flow from a supply source (not shown) and to supply the gas flow to a burner (not shown). The thermoelectric safety device 60 is operatively connected to the inlet conduit 23 and crosses it at an elbow portion 230 thereof, which is formed in a shoulder 231 adapted to receive in abutment a closure member operatively connected to the thermoelectric safety device 60.

A chamber 25 having a substantially cylindrical shape is formed inside the body 20 of the thermostat 10 and arranged in fluid communication with the inlet conduit 23.

The chamber 25 is also arranged in fluid communication with the outlet conduit 24 through a main opening 70 and through a secondary conduit 71 formed in body 20 of the thermostat, which bypasses the main opening 70 and fluidly communicates with the outlet conduit 24.

The main opening 70 and the secondary conduit 71 are respectively sized for a maximum and a minimum flow of gas.

A valve 80 for the regulation of the flow rate of the gas flow is arranged inside the chamber 25. The valve 80 is a one-piece valve inserted in the chamber 25 and also movable coaxially thereto from a first, maximum opening position wherein the main opening 70 is completely clear allowing passage of a gas flow to the outlet conduit 24, to a second, closed position wherein the main opening 70 is completely closed by the valve and the gas flow reaches the outlet conduit 24 through the secondary conduit 71. The movement of the valve 80 between the first and the second positions thus determines the flow rate of the gas supplied to the burner, which ranges from a maximum to a minimum flow rate, thus allowing to achieve a range of temperatures within the compartment to be heated.

In the illustrated embodiment, an axis of the chamber 25 is oriented in a first direction A of the body 20 of the thermostat 10 and the inlet conduit 23 is connected to the chamber 25 through an opening formed in its peripheral wall.

The main opening 70 is formed at one end of the chamber 25 in the first direction A so as to allow fluid communication with the outlet conduit 24 in the same direction A. Hence, the chamber 25, the main opening 70 and the outlet conduit 24 are arranged in series.

The secondary conduit 71 is instead connected to the chamber 25 through an opening formed in its peripheral wall and has a U-shape whose straight branches extend parallel to one another transversely to the chamber 25 in a second direction B of the body 20 the thermostat 10 perpendicular to the first direction A, and are connected together by an elbow portion.

The secondary conduit 71 so configured connects the chamber 25 with the outlet conduit 24 downstream of the main opening 70 with respect to the direction of the gas flow through the body 20 of the thermostat 10. This configuration allows to supply gas to the burner at a minimum flow rate when the valve 80 is in the closed position.

The one-piece valve 80 has a substantially cylindrical shape and comprises a pair of flanges 81, 82 formed at its ends. In the illustrated embodiment, a first flange 81 is arranged so as to face the main opening 70 of the chamber 25 which communicates with the outlet conduit 24 and has a diameter suitable to occlude in the closed position of the valve 80, while a second flange 82 closes the chamber 25 at the opposite end and to this aim it is provided with a circumferential groove wherein a sealing element 83 of the valve 80 suitable to prevent gas leakages may be inserted.

The diameters of the flanges 81, 82 are substantially equal to that of the cylindrical chamber 25, which thus acts as a guide for the valve 80, while the portion of the valve 80 between the two flanges 81, 82 has a diameter smaller than that of the chamber 25 and defines a volume therewith having a substantially toroid shape suitable to allow passage of the gas supplied from the inlet conduit 23.

This structural configuration allows to minimize the overall size of the body 20 of the thermostat 10.

At the end of the chamber 25 opposite to the end at which the main opening 70 is formed, a flat lid 26 partially closing the chamber 25 is fixed to the body 20 of the thermostat 10. The flat lid 26 restricts the movement of the valve 80 coaxially to the chamber 25 and then determines the position of maximum opening.

The valve 80 comprises a drive portion 84 formed on the flange 82 which closes the chamber 25 at the end opposite to the end at which the main opening 70 is formed. In an assembled configuration of the thermostat 10, the valve 80 is urged by a helical spring (not shown) away from the main opening 70 and the drive portion 84 protrudes from the body 20 through a circular opening formed in the lid 26, pressing against the expandable member 53 of the thermostatic bulb 50. As it will be described below, this configuration allows to control the normal operation of the thermostat.

In FIGS. 2 to 4, the gas flow through the body 20 of the thermostat 10 is schematically shown by way of a plurality of arrows.

FIG. 2 shows a non-operating condition of the thermostat 10, wherein the thermoelectric device 60 is in a blocking condition preventing a flow of gas from entering the chamber 25.

FIG. 3 instead shows an operating condition of the thermostat, wherein the valve 80 is spaced from the opening 70 and arranged in the maximum opening position. In this operating condition the gas supplied from the inlet pipe 23 fills the chamber 25 and flows into the outlet conduit 24 through the main opening 70 passing around the flange 81.

In positions of the valve 80 comprised between the maximum opening position and the closing position, the gas flow rate through the main opening 70 is progressively reduced and in the closed position of the gas that fills the chamber 25 flows at a minimum flow rate solely through the secondary conduit 71. This minimum flow rate operating condition is shown in FIG. 4.

The minimum flow rate of gas in the secondary conduit 71 can advantageously be adjusted by means of a valve, for example a needle valve controlled by way of an adjuster screw.

In the illustrated embodiment a needle valve 90 is shown, which is inserted in a partially threaded hole formed in the body 20 of the thermostat and provided with a suitable sealing element, such as an O-ring.

The needle valve 90 crosses the secondary conduit 71 at its elbow portion, which to this aim has a frustum-conical shape adapted to receive in abutment a corresponding frustum-conical end portion 91 of the needle valve 90. This configuration is advantageous, because it provides more room for housing the needle valve 90.

The needle valve 90 of the thermostat 10 according to the invention also comprises an axial hole 92 formed at its frustum-conical end portion 91 and a plurality of radial holes 93, e.g. four holes, formed in the cylindrical portion immediately adjacent the frustum-conical end portion 91 and arranged in fluid communication with the axial hole 92, thus allowing fluid communication through the secondary conduit 71 also when the frustum-conical portion 91 of the needle valve 90 abuts the frustum-shaped elbow portion. Hence, this configuration always ensures passage of a gas flow through the secondary conduit 71, and then operation at a minimum flow rate of a burner connected to the thermostat 10 according to the invention.

In a normal operating condition of the thermostat 10, a user sets a desired temperature with the aid of a graduated scale by acting on a knob (not shown) connected to the rotatable coupling member 40. The rotation direction of the rotatable coupling member 40 is schematically shown in FIGS. 2 to 4 by an arrow R.

As explained above, the rotatable coupling member 40 acts on the valve 80 through the expandable member 53 of the thermostatic bulb 50 and when it is rotated by a user in order to set a desired operating temperature it defines a maximum opening position for the valve 80. Under normal operating conditions, i.e. once reached a desired temperature, if the temperature inside the heated compartment increases, the expandable member 53 of the thermostatic bulb 50 is expanded thus pressing against the drive portion 84 of the valve 80. Consequently the valve 80 is moved towards the main opening 70 of the chamber 25 thus reducing the flow rate of the gas supplied to the burner and lowering the temperature.

When the temperature inside the heated compartment instead decreases, the expandable member 53 of the thermostatic bulb 50 is contracted thus allowing a higher opening of the valve 80, which is biased in the open position by a spring, thus increasing the flow rate of the gas supplied to the burner and consequently raising the temperature. In this way it is possible to obtain an operating condition of the system wherein the temperature in the heated compartment varies in a predetermined tolerance range around a desired value set by the user.

As explained above, the thermostat 10 is also provided with a thermoelectric safety device 60. This device comprises in known manner an electromagnet 61 controlled by a thermocouple (not shown). The electromagnet 61 is provided with a plate member 62 movable from an unlocking position to a blocking position respectively to open or close the inlet conduit 23 of the gas. The movable plate member 62 is urged by a spring (not shown) away from the electromagnet 61. When the thermocouple is heated by the flames of the burner, due to the well-known Seebeck effect the electromagnet 61 is electrically supplied and generates a force on the plate member 62 opposing the force of the spring biasing it, thus causing opening of the inlet conduit 23 of the gas, that enters the chamber through the inlet opening 21 formed in the body 20 of the thermostat 10. When the thermocouple cools down due to intentional or accidental switch off of the burner flames, the electromagnet 61 is no longer electrically supplied and releases the plate member 62 which closes the inlet conduit 23 of the gas urged by the spring biasing it.

As it is known, in order to ignite a burner connected to a thermostat provided with a thermoelectric safety device, it is necessary to manually unlock the thermoelectric safety device by typically pressing the knob to the body of the thermostat and maintaining this position until the thermocouple supplies electromagnet with a current sufficient to keep the inlet conduit of the gas open. To this aim, a drive rod is typically inserted in a hole formed in the body of the thermostat and arranged below the knob. The drive rod extends from the knob to the plate member of the electromagnet of the safety device, thus allowing unlocking of the latter by pressing on the knob.

The drive rod is biased towards the knob typically by an helical spring.

According to a further aspect of the invention, the drive rod 100 of the thermoelectric safety device 60 does not act on the plate 62 of the electromagnet 61 directly, but through a thrust member 110 telescopically that is inserted therein and is urged in away therefrom by a spring (not shown).

In an assembled configuration of the thermostat 10, the thrust member 110 is arranged in the inlet conduit 23 at the shoulder 231 formed in the elbow 230 and contacts the movable plate member 62 of the electromagnet 61. The thrust member 110 includes a flange 111 provided with a gasket 112 dimensioned so as to seal the inlet conduit 23 by pressing against the shoulder 231 when the electromagnet 61 is not powered by the thermocouple. This configuration is advantageous compared to a direct drive of the plate member 62 of the electromagnet 61 by the drive rod 100, because it allows to reduce the stroke of the plate member 62 of the electromagnet 61 and its overall size, while allowing a rapid closure of the inlet conduit 23 when the flame of the burner is switched off.

Furthermore, this configuration allows immediate switch off of the burner upon rotation of the knob in an off position, because a movement of the drive rod 100 away from the electromagnet 61 immediately determines movement of the thrust member 110 towards the shoulder 231. Differently, in the absence of the thrust member 110, there would be an operating condition at a minimum flow rate wherein the gas flow could not be blocked, even turning the knob in the off position.

The drive rod 100 is not directly driven by the knob, but from its rotatable coupling member 40 and is urged towards it by a spring 101 arranged between the flat lid 26 of the body 20 of the thermostat 10 and a retaining ring 102 axially restrained to the drive rod 100 in correspondence with a circumferential groove formed therein.

According to the present invention, the rotatable coupling member 40 comprises a cam profile 41 formed on the surface facing the drive rod 100 and configured so as to engage the latter only beyond a certain rotation angle of the knob fixed to the rotatable coupling member 40 in the direction indicated by the arrow R, thus making the thermostat 10 inherently reliable also in case of accidental rotation of the knob.

In the illustrated embodiment, the cam profile 41 is for example configured to act on the drive rod 100 beyond a rotation angle corresponding to 52°. Engagement of the drive rod 100 by the cam profile 41 does not determine release of the thermoelectric safety device 60, which anyway requires a manual movement of the knob, and then of the rotatable coupling member 40, toward the body 20 the thermostat 10. However, the use of the cam profile 41 is advantageous because it allows to reduce the manual stroke of the knob to thus enhancing control ergonomics of the thermostat.

The embodiment of the invention above described and illustrated is just an example susceptible of numerous variants. For example, the expandable member 53 of the thermostatic bulb 50, which is of a membrane type, could be replaced with a piston element. Moreover, the cam profile 41 might be configured to engage the drive rod 100 upon rotation angles different from 52°.

What is claimed is:

1. A thermostat (10) for cooking appliances powered by gas, said thermostat (10) comprising:
   a body (20), within which there are formed,
      an inlet duct (23) and an outlet duct (24)) respectively configured to receive a gas flow from a supply source and to supply said gas flow to a gas burner,
      a chamber (25) with a substantially cylindrical shape disposed in fluid communication with said inlet duct (23), wherein said chamber (25) is also disposed in fluid communication with said outlet duct (24) either directly through a main opening (70) formed at one end thereof, or indirectly, through a secondary duct (71) formed in the body (20) of the thermostat (10) and flowing into the outlet duct (24) bypassing said main opening (70), said main opening (70) and secondary duct (71) being respectively dimensioned for a maximum and a minimum flow rate of gas; and
   a valve (80) having a cylindrical shape and configured to regulate the flow rate of the gas,
   wherein said valve (80) is a one-piece valve fitted in the chamber (25) coaxially thereto and movable between a first position, wherein the main opening (70) is completely clear, thereby allowing passage of the gas flow toward the outlet duct (24), and a second position, wherein the main opening (70) is completely closed by the valve (80) and the gas flow reaches the outlet duct (24) through the secondary duct (71) only,
   wherein said valve (80) comprises a pair of flanges (81,82) formed at free ends of said valve, a first flange (81) facing the main opening (70) of the chamber (25) and having a diameter dimensioned to close the main opening in said second position, and a second flange (82) closing the chamber (25) at an opposite end thereof, said second flange (82) being provided with a circumferential groove configured to receive a sealing element (83) of the valve (80) to prevent an escape of the gas from the chamber (25), diameters of the first and the second flanges (81,82) substantially corresponding to a diameter of the chamber (25), and
   wherein said inlet duct (23) and said secondary duct (71) are in fluidic communication through said substantially cylindrical chamber (25) at any axial position of said valve (80).

2. The thermostat (10) according to claim 1, further comprising a thermostatic bulb (50), said thermostatic bulb (50) comprising a probe (51) configured to be inserted in a compartment to be heated and an expandable member (53) connected to said probe (51) through a conduit (52), a thermally expandable fluid medium being provided inside the conduit, said expandable member (53) being operably connected to the valve (80) at said second flange (82).

3. The thermostat (10) according to claim 2, wherein an end of the chamber (25) is formed opposite to an end where the main opening (70) is provided, the chamber (25) being partially closed by a lid (26) fixed to the body (20), and wherein the valve (80) comprises a drive portion (84) formed on the second flange (82), said drive portion (84) being in contact with the expandable member (53) of the thermostatic bulb (50).

4. The thermostat (10) according to claim 3, wherein, in an assembled configuration of the thermostat (10), the valve (80) is biased by a spring away from the main opening (70), and wherein said drive portion (84) protrudes from the body (20) through a circular opening formed in said lid (26).

5. The thermostat (10) according to 1, wherein the secondary duct (71) has a U-shape whose straight branches extend parallel to each other transversally to the chamber (25) and are connected to each other by an elbow portion, and wherein the thermostat (10) further comprises a needle valve (90) inserted into a partially threaded hole formed in the body (20), said needle valve (90) crossing the secondary conduit (71) at said elbow portion.

6. The thermostat (10) according to claim 5, wherein the elbow portion of the secondary duct (71) has a frustum-conical shape configured to receive in abutment a corresponding frustum-conical end portion (91) of the needle valve (90).

7. The thermostat (10) according to claim 6, wherein the needle valve (90) further comprises an axial bore (92) formed at the frustum-conical end portion (91) of the needle valve, a plurality of radial holes (93) being formed in a cylindrical portion contiguous to the frustum-conical end portion (91) of the needle valve, said radial holes (93) being disposed in fluid communication with said axial bore (92).

8. The thermostat (10) according to claim 1, further comprising a thermoelectric safety device (60) configured to block the gas flow through the body (20), said thermoelectric safety device (60) being operably connected to the inlet conduit (23) at an elbow portion (230) thereof.

9. The thermostat (10) according to claim 8, further comprising a drive rod (100) configured to enable actuation of the thermoelectric safety device (60), said drive rod (100) being inserted in a hole formed in the body (20) of the thermostat (10) and protruding from the body (20) through a cover (30) thereof.

10. The thermostat (10) according to claim 9, wherein the drive rod (100) comprises a thrust member (110) telescopically inserted therein and urged away therefrom by a helical spring, said thrust member (110) being arranged in the inlet duct (23) at a shoulder (231) of the elbow portion (230) and comprising a flange (111) provided with a gasket (112) configured to seal the inlet conduit (23) at said shoulder (231), the thrust member (110) being operably connected to the thermoelectric safety device (60) in an assembled configuration of the thermostat (10).

11. The thermostat (10) according to claim 10, further comprising a coupling member (40) configured to enable connection of a knob for ignition of the gas burner and temperature regulation, said coupling member (40) being rotatably coupled to said cover (30) of the body (20) of the thermostat (10) and operably connected to the valve (80) through an expandable member (53) of a thermostatic bulb (50).

12. The thermostat (10) according to claim 11, wherein the coupling member (40) comprises a cam profile (41) formed on a surface of the coupling member, the cam profile facing said cover (30) and being configured to engage the drive rod (100) only beyond a predetermined angle of rotation of the rotatable coupling member (40).

* * * * *